United States Patent [19]
Watts

[11] 3,870,254
[45] Mar. 11, 1975

[54] LANDING GEAR AND LOCKING APPARATUS THEREFOR

[75] Inventor: John Watts, Bellevue, Wash.

[73] Assignee: The Boeing Company, Seattle, Wash.

[22] Filed: Mar. 28, 1973

[21] Appl. No.: 345,673

[52] U.S. Cl. .......................................... 244/102 SL
[51] Int. Cl. ............................................. B64c 25/26
[58] Field of Search ..... 244/102 R, 102 SL, 102 SS, 244/103 R, 104 R, 100 R

[56] References Cited
UNITED STATES PATENTS

| | | | |
|---|---|---|---|
| 2,471,603 | 5/1949 | Bishop | 244/102 SL |
| 2,982,500 | 5/1961 | Lucien | 244/102 R |
| 3,580,531 | 5/1971 | Bock et al. | 244/102 R |

FOREIGN PATENTS OR APPLICATIONS

| | | | |
|---|---|---|---|
| 1,090,016 | 3/1955 | France | 244/102 R |
| 1,246,932 | 10/1960 | France | 244/102 R |

Primary Examiner—Trygve M. Blix
Assistant Examiner—Paul E. Sauberer
Attorney, Agent, or Firm—Christensen, O'Connor, Garrison & Havelka

[57] ABSTRACT

A landing gear apparatus has a main strut mounted to an aircraft body. A trailing arm is pivotally connected to the lower portion of the main strut. Ground engaging wheels are rotatably mounted on an axle extending transversely from the trailing arm rearwardly of its pivotal mounting to the strut. A telescoping shock absorber is pivotally mounted to the trailing arm forwardly of the axle and rearwardly of the main strut. The top portion of the shock absorber is pivotally connected to an arm which in turn is pivotally attached to the top portion of the main strut. A fluid powered retraction cylinder is connected between the aircraft body and the arm to move the arm about its pivotal connection to the main strut, thereby lifting the shock absorber and the trailing arm to a retracted position. A single cross-center, double-acting, latch mechanism is utilized to lock the arm in both the extended and retracted positions.

2 Claims, 6 Drawing Figures

LANDING GEAR AND LOCKING APPARATUS THEREFOR

BACKGROUND OF THE INVENTION

This invention relates to retractable landing gear and more particularly to a locking mechanism for holding the gear in extended and retracted positions.

Retractable landing gear disclosed in the prior art have employed separate locking or latching mechanisms to hold retractable landing gear in an extended position and retracted position. The use of separate latching devices unnecessarily complicates the overall retractable landing gear apparatus. In addition, separate mechanisms for preforming each of these functions in a retractable landing gear necessarily increases the overall weight of the structure. It is, of course, desirable in most instances to reduce and maintain at the lowest level possible the weight and complexity of retractable landing gear mechanisms to achieve an increase in the payload or speed of the aircraft.

Therefore, objects of the invention are to provide a simple retractable landing gear mechanism, to provide simple mounting structure for the landing gear, and to provide a single, double-acting locking mechanism for both retraction and extension of the gear which performs the function previously performed by two or more mechanisms.

SUMMARY OF THE INVENTION

The present invention provides retractable landing gear apparatus comprising in combination a main support strut, a trailing arm and first means pivotally connecting the trailing arm to the lower portion of the main strut, wheel means and axle means mounting the wheel means for rotation on the aft portion of the trailing arm, an articulated retraction strut including shock absorber means, second means pivotally mounting one end of the retraction strut to the trailing arm about a first axis and third means mounting the other end of the retraction strut to the support strut about a second axis parallel to the first axis, the retraction strut further having articulating means for bending the retraction strut about a third axis parallel to the first axis, the articulation means located between the second and third means, the third axis lying substantially in a first plane defined by the first and second axes thereby to position the trailing arm in an extended position, the third axis being movable to a location a spaced distance from a second plane defined by the first and second axes to shorten the distance between the first and second means and thereby position the trailing arm in a retracted position, linkage means connected between the main support strut and said articulating means, the linkage means so arranged and operative to lock the first, second and third axes in the first plane when the trailing arm is in the extended position and to lock the third axis out of the plane when the trailing arm is in a retracted position, power means connected to the articulated retraction strut for moving the articulating means to extend and retract the trailing arm.

BRIEF DESCRIPTION OF THE DRAWINGS

A better understanding of the present invention can be acquired by reading the ensuing specification in conjunction with the accompanying drawings wherein.

DESCRIPTION OF THE PREFERRED EMBODIMENT

Figure 1:
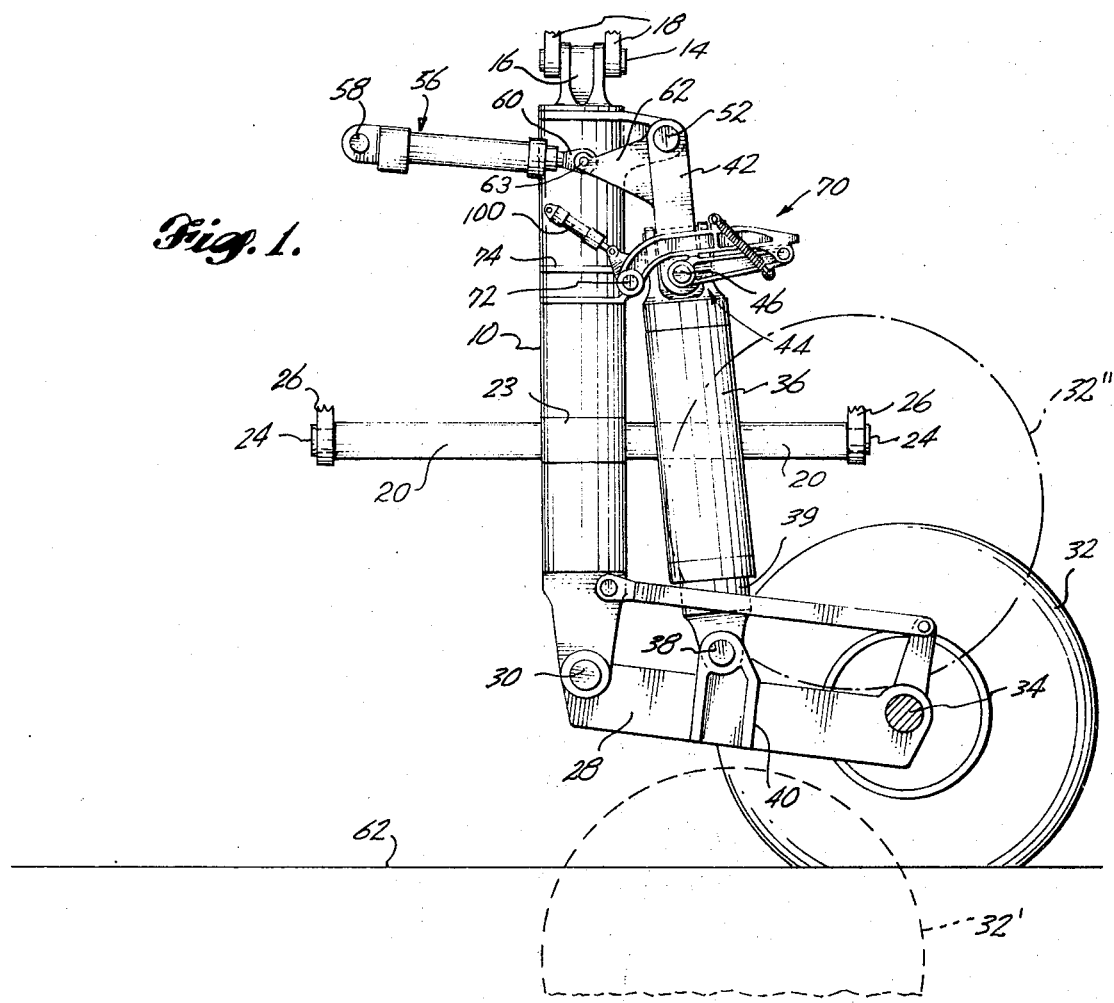
FIG. 1 is a side view of the landing gear apparatus and latching mechanism of the present invention with the outboard wheel removed by section through the axle.
Figure 2:
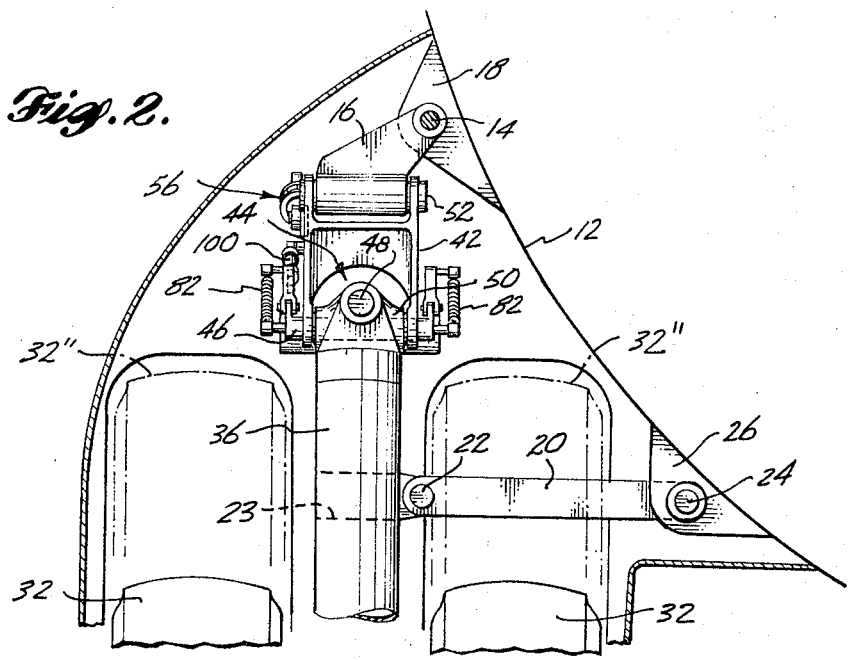
FIG. 2 is a rear view of the mechanism of FIG. 1 with the lower portion of the apparatus cut away.

Referring to FIGS. 1 and 2 a main strut 10 is supported on an aircraft 12, shown in outline in FIG. 2, at three points. The pin 14 connects an upper flange 16, secured to the uppermost portion of the main strut 10, to a flange 18 secured to the aircraft 12. A triangular brace 20 is connected by pin 22 to a collar 23 secured to the intermediate portion of the main strut 10. The brace 20 is connected by the pins 24 to spaced flanges 26 (only one of which is shown in FIG. 2) secured to the aircraft 12.

The forward portion of a trailing arm 28 is pivotally mounted by pin 30 to the lowermost portion of the main strut 10. A set of wheels 32 are mounted for rotation on axle shaft 34 in turn affixed to the rearmost portion of the trailing arm 28. A telescoping shock absorber 36 is pivotally connected by the pin 38 to a flange 40. The flange 40 is secured to the trailing arm 28 at a location between the pivot pin 30 and the axle shaft 34. The shock absorber 36 is of the conventional fluid type containing an outer tube and a telescoping shock rod 39. The uppermost end of the shock absorber 36 is connected to an arm 42, having upper and lower yoke portions, through a universal joint 44. The universal joint 44 includes a cross member 50 to which are fixed a first pin 46 and a second pin 48 positioned transversely to the pin 46. The pin 48 interconnects the cross member 50 of the universal joint 44 with the uppermost portion of the shock absorber 36. The pin 46 pivotally interconnects the cross member 50 of the universal joint 44 with the lower yoke portion of the arm 42. The upper yoke portion of arm 42 is pivotally connected by pin 52 to a flange secured rearwardly adjacent the uppermost portion of the main strut 10. The axis of pin 52 is substantially parallel to the axes of pins 38 and 46.

A fluid powered cylinder, generally designated 56, has its forward end pivotally connected to the structure of the aircraft 12 by an elongate pin 58. A piston rod 60 translatable within cylinder 56 is pivotally connected by pin 63 to a flange 62 extending forwardly from the top portion of arm 42. As discussed later, the cylinder and rod are employed to retract the landing gear.

The landing gear as shown in FIG. 1 is in the static ground position wherein the wheels 32 are resting on ground level 62. The fully extended position of the wheels in flight is represented by the dot-dash line 32', while the fully retracted position of the wheels in flight is represented by the dot-dash line 32". These lines are shown here for later reference. In the extended position, a double-acting latch mechanism, generally designated 70, connects to the pin 46 and to a second pin 72 mounted on a collar 74 forwardly adjacent of the pin 46. The collar 74 is secured to the main strut 10. By double-acting it is meant that the single mechanism 70 serves to lock the gear in both the retracted and extended positions.

Figure 3:
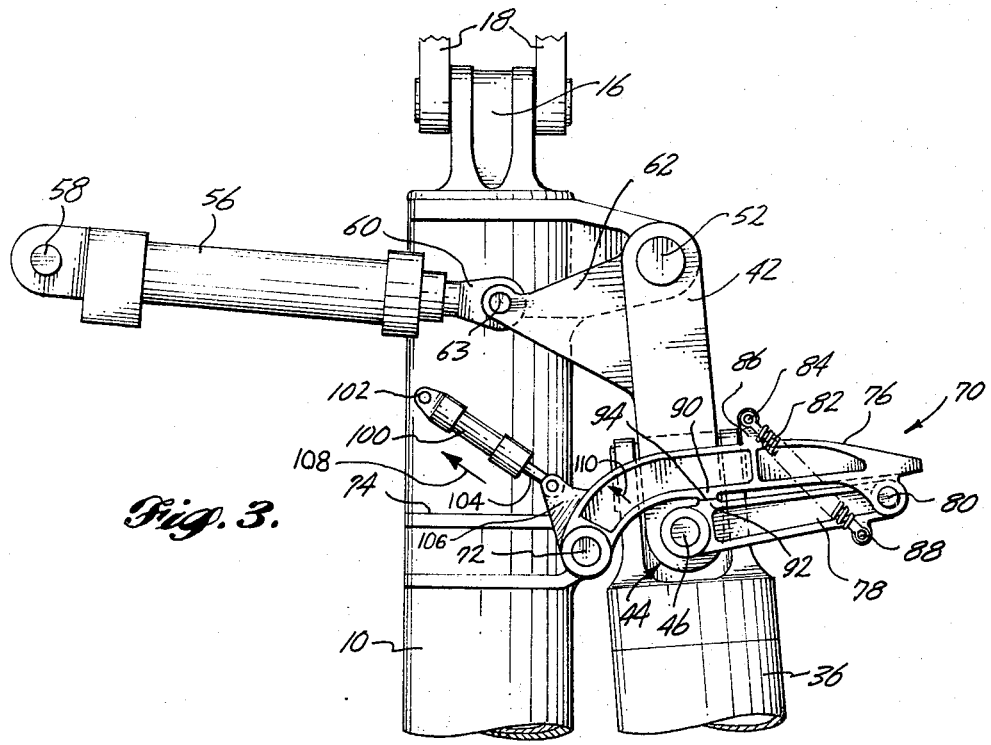
FIG. 3 is an enlarged side view of the upper portion of the landing gear mechanism as shown in FIG. 1, illustrating the latching linkage in an extended and locked position.

For a more detailed description of the structure and operation of the double-acting, latching mechanism, refer to FIGS. 3 through 6. In FIG. 3 the latching mechanism, in a locked position when the landing gear is fully extended, incorporates a first link 76 having a somewhat U-shaped configuration. One end of the link 76 is pivotally attached by the pin 72 to the flange 74 as described above. One end of a substantially straight second link 78 is pivotally connected to the pin 46 of the universal joint 44. The two links 76 and 78 are also pivotally interconnected by the pin 80 at their other ends. A bungee spring 82 is pivotally connected by pin 84 to a flange 86 extending a small distance upwardly from the central portion of the U-shaped link 76. The other end of the bungee spring 82 is pivotally connected by pin 88 to a downwardly extending flange on the straight link 78. The bungee spring 82 is maintained in tension at all times. In the locked position bungee spring 82 tends to pull the links 76 and 78 together. In this position the links 76 and 78 are folded back upon each other until two protrusions 90 and 92, on the links 76 and 78, respectively, abut each other along the mating surface 94. In this position the axis of pivot pin 80 lies below the plane defined by the two pivot pins 72 and 46. Furthermore, in this position the pivot pin 46 lies in the plane formed by the pivot pins 38 (FIG. 1) and 52, preventing vertical motion of the pin 46. The lateral or forward and aft motion of pin 46 is limited by the presence of the latching linkage 70. Since the pivot pin 80 is "over center" of the pins 72 and 46, i.e., across the plane defined by the axes of pins 72 and 46, the linkage cannot be moved. Thus the landing gear is locked in the extended position as shown.

Links similar to links 76 and 78 are located on both the inboard and outboard sides of the main strut and shock absorber. As they are essentially identical on both sides and connected to opposite ends of the pins 46, 72 and 80, only the front or outboard side of locking links is discussed in FIG. 3 and in the ensuing FIGS.

Figure 4:
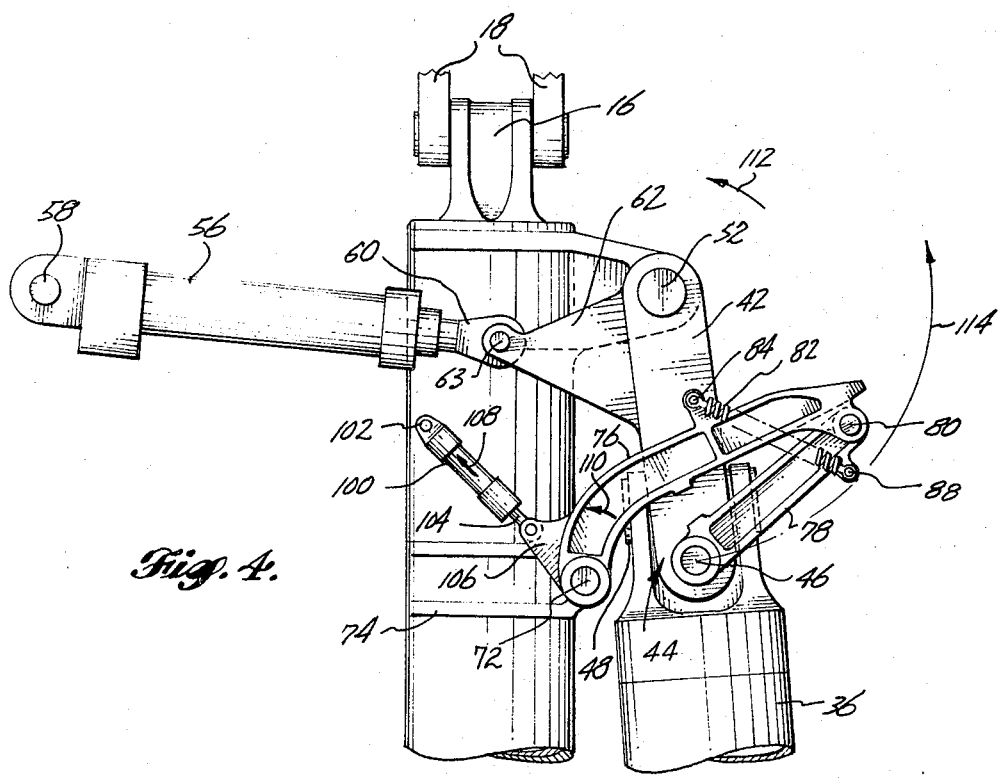
FIGS. 4 and 5 are similar to FIG. 3, but illustrate the positions of the landing gear apparatus and the latching mechanism intermediate the fully extended and fully retracted positions.

Referring now to FIGS. 3 and 4, the sequence of unlocking the latching mechanism will be described. A fluid powered cylinder 100 is pivotally mounted at its forward end by pin 102 to the main strut 10. An extensible piston rod 104 is pivotally connected to a flange 106 extending rearwardly from and secured to the arm 76 a spaced distance from the pin 72. To begin the unlocking sequence fluid power is applied to the cylinder 100 (by means not shown), causing the piston rod 104 to retract within the cylinder 100 in the direction of arrow 108. This motion of the rod 104 will cause the arm 76 to rotate about the pin 72 in the counterclockwise direction of arrow 110. As shown in FIG. 4, the pivotal axis of pivot pin 80 is moved across the plane formed by the pivotal axes of pin 72 and 46 as the link 76 continues to rotate in the direction of arrow 110. Of course, the force transmitted to the arm 76 by the piston rod 104 must be sufficient to overcome the spring tension of the bungee spring 82. At the same time fluid power is applied to cylinder 56 (by means not shown) to cause the piston rod 60 to extend from the cylinder 56. Through flange 62 motion is transmitted to the link 42, causing it to rotate about pin 52 in the counterclockwise direction of arrow 112. As this occurs, the pin 46 will begin to travel through the arc 114 and lift the shock absorber 36 upwardly by means of the universal joint connection.

Figure 5:
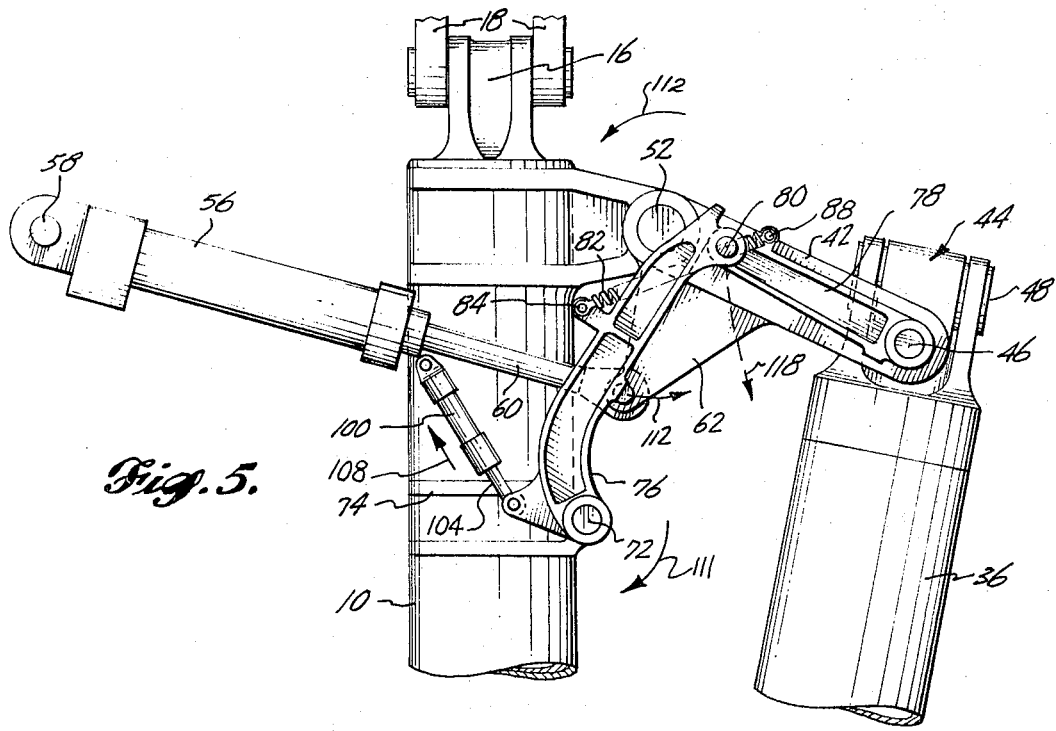

Referring to FIG. 5, as the power cylinder 56 continues to rotate the arm 42 in the direction of arrow 112, the shock absorber 36 will continue to be lifted up to approach its fully retracted position. At this point the fluid power applied to cylinder 100 still tends to cause the rod 104 to translate into cylinder 100. During the movement from the position immediately after unlocking (as shown in FIG. 4) to the position shown in FIG. 5 the two links 76 and 78 are continuously unfolding, while link 76 is rotating about the axis of pin 72 in a counterclockwise direction. As the pin 46 continues to rise due to the exertion of force through the piston rod 60, the link 76 will reverse its direction of rotation, as shown by arrow 111 causing the pivotal axis of pin 80 to drop, following the path prescribed by the arrow 118, and approach the plane formed by the pivotal axes of pins 72 and 46. As this occurs the pin 80 will continue in its path and pass through the plane defined by the axes of the pins 84 and 88 connecting the bungee spring 82 to the links 76 and 78, respectively. The tension of the bungee spring 82 and the force applied through the piston rod 104 thereafter will tend to pull pin 80 toward and through the plane formed by the pivotal axes of pins 72 and 46.

Figure 6:
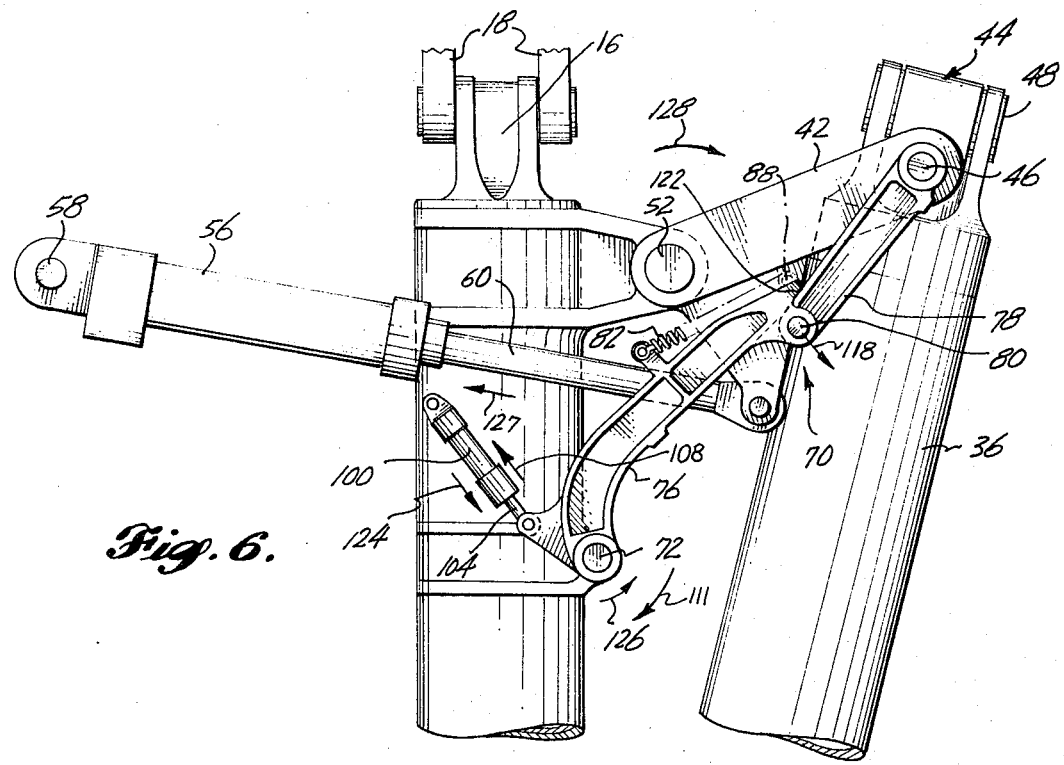
FIG. 6 is a view similar to FIGS. 4 and 5 showing the landing gear and the latching mechanism in a fully retracted and locked position.

Referring to FIG. 6, the pivotal axis of the pin 80 has crossed through the plane defined by the pivotal axes of pins 46 and 72. In this view the connection of the bungee spring to link 78 is omitted for clarity in viewing the abutting relationship of the shoulder 122 of link 76 onto the link 78. The force applied to links 76 and 78 by the bungee spring 82 and through the piston rod 104 tends to move the pivotal axis of pin 80 further along the path shown by arrow 118. A shoulder 122 on the link 76 extending toward the link 78 bears on what is now the upper side of link 78 to stop or limit the motion of the pivot pin 80 with respect to the plane of the pivot pins 72 and 46.

As can be seen in this view, the arm 42 has been raised into its uppermost position in which the shock absorber 36 is raised to a fully retracted position. This position of the shock absorber 36 corresponds to the height to which the wheel would be lifted as shown by the dot-dash line 32'' in FIG. 1. In addition to the advantage of simplicity and few moving parts, the configuration of the latching linkage 70 as shown in FIG. 6 has a second advantage in the event of power failure. To unlock the mechanism in such event, manual force need only be applied to the connection of links 76 and 78 at pivot pin 80 in a direction opposite to that of arrow 118 sufficient to overcome the tension provided by the bungee spring 82. Once the axis of pivot pin 80 is brought in a reverse direction to the position shown in FIG. 5, the landing gear will automatically extend due to its weight. The latching linkage will then return to its locked and extended position as shown in FIG. 3.

In a conventional extension mode, the fluid powered cylinder 100 functions to unlock the latching mechanism 70 from the retracted position. Fluid power is applied to the cylinder 100 (by means not shown) to cause piston rod 104 to extend in the direction of arrow 124. This will cause the link 76 to rotate about pin 72 in the direction of arrow 126, in turn bringing the pivotal axis of the pin 80 upwardly across the plane formed by the pivotal axes of pin 72 and 80. At the same time fluid power is applied to the retraction cylinder 56 to withdraw the piston rod 60 in the direction of arrow 127. Link 42 is thus rotated in the direction of arrow 128 thereby lowering the shock absorber 36 to a fully extended position.

The present invention has been described in relation to a preferred embodiment. After reading the foregoing specification, one of ordinary skill in the art will be able to effect various alterations, substitutions of equivalence and other changes without departing from the original concept of the invention. It is therefore intended that the present invention be limited only by the scope of the appended claims.

What is claimed is:

1. A retractable landing gear apparatus comprising in combination:
   a main support strut,
   a trailing arm and first means pivotally connecting said trailing arm to the lower portion of said main strut,
   a wheel and means mounting said wheel for rotation on the aft portion of said trailing arm,
   an articulated retraction strut including shock absorber means, second means mounting one end of said retraction strut to said trailing arm for pivotal movement about a first axis and third means mounting the other end of said retraction strut to said main strut for pivotal movement about a second axis parallel to said first axis, said retraction strut including means for articulating said retraction strut about a third axis parallel to said first and second axes and located between said first and second axes, said third axis lying substantially in a first plane defined by said first and second axes when said trailing arm is in an extended position, said third axis being spaced from said first plane when said trailing arm is pivoted upwardly to a retracted position to thereby decrease the distance between said first and second axes,
   a first link and means connecting said first link to said main strut for pivotal movement about a fourth axis parallel to said first axis,
   a second link and means connecting said second link to said retraction strut for pivotal movement about a fifth axis parallel to said first axis, and means connecting said first and second links for pivotal movement about a sixth axis parallel to said third axis,
   said links and connecting means cooperating such that, when said trailing arm is in said extended position, said links fold toward each other so that said sixth axis is on one side of a second plane defined by said fourth and fifth axes when said link means are folded, said first and second links including first stop means cooperating to prevent further movement of said sixth axis away from said second plane,
   said links and connecting means cooperating such that, when said trailing arm is in a retracted position and said third axis of said articulated strut is moved away from said first plane, said links unfold to a position wherein said sixth axis is located on the other side of said second plane defined by said fourth and fifth axes, said first and second links including second stop means cooperating to prevent further movment of said sixth axis away from the other side of said second plane, and
   force-producing means operatively connected to at least one of said link means for biasing said sixth axis away from said second plane when said trailing arm is in said extended position and when said trailing arm is in said retracted position, and
   power means operatively connected to said articulated retraction strut for moving said articulating means to extend and retract said trailing arm.

2. The apparatus of claim 1 wherein said force-producing means comprises a spring in tension, one end thereof being pivotally attached to said first link, the other end thereof being pivotally attached to said second link.

* * * * *